No. 759,306. PATENTED MAY 10, 1904.
C. C. PECK.
APPARATUS FOR MEASURING HEAT IN HOT WATER HEATING SYSTEMS.
APPLICATION FILED AUG. 20, 1902.
NO MODEL. 4 SHEETS—SHEET 1.
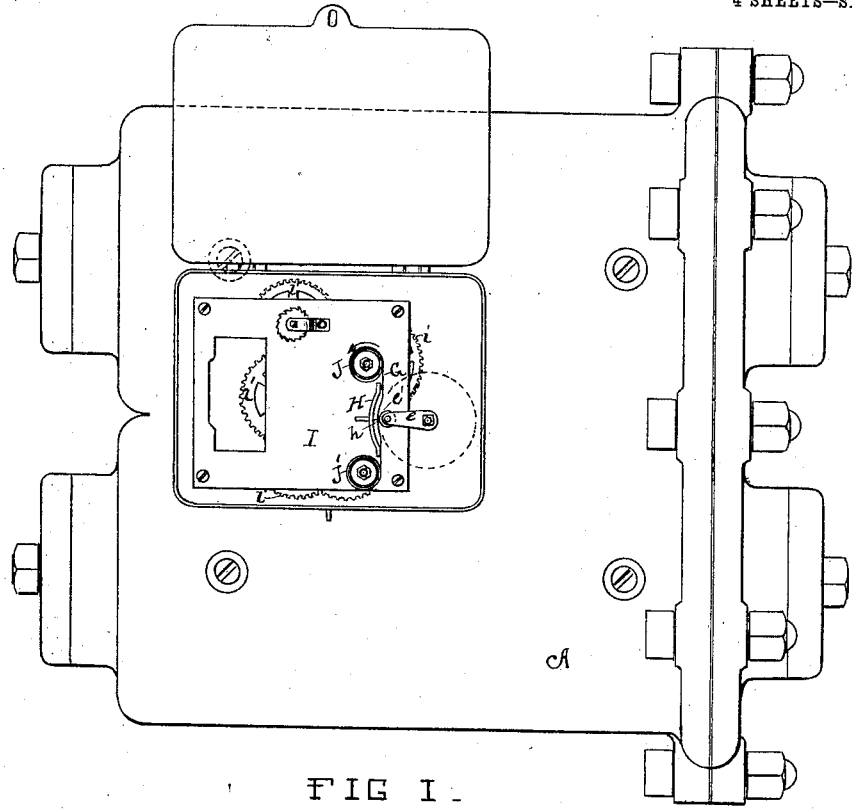
FIG I.
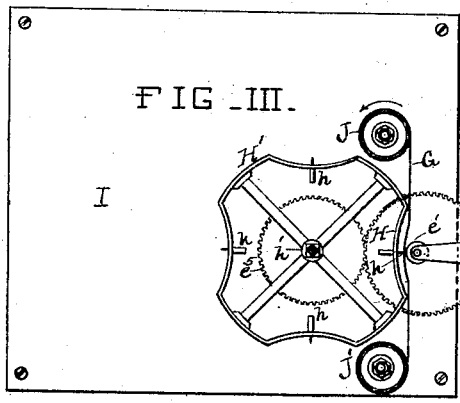
FIG. III.
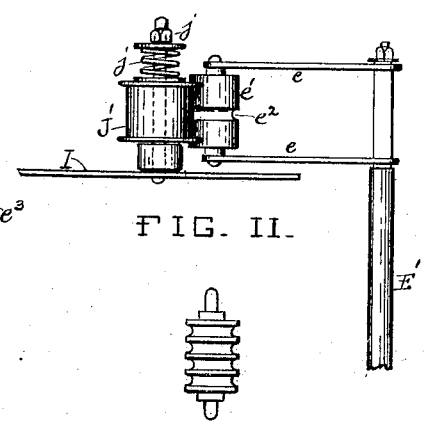
FIG. II.
FIG. IV.
WITNESSES:
Wm. W. Hill
L. D. Peck
INVENTOR:
Cassius Carroll Peck No. 759,306. PATENTED MAY 10, 1904.
C. C. PECK.
APPARATUS FOR MEASURING HEAT IN HOT WATER HEATING SYSTEMS.
APPLICATION FILED AUG. 20, 1902.
NO MODEL. 4 SHEETS—SHEET 2.
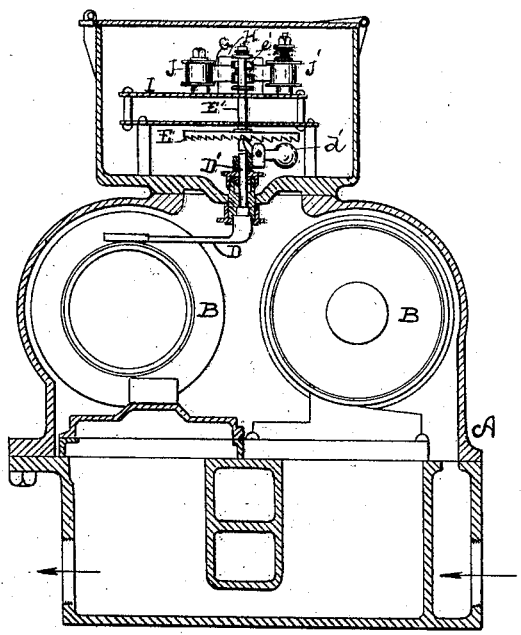
FIG. V.
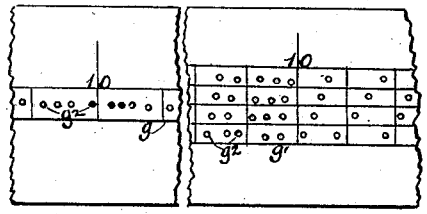
FIG. VI.   FIG. VII.
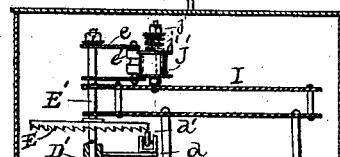
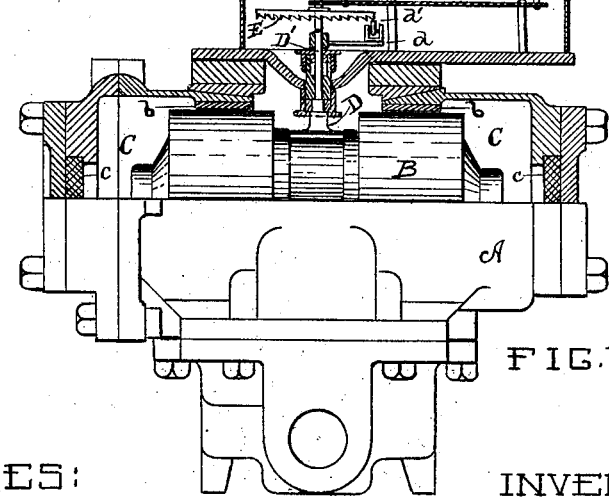
FIG. VIII.
WITNESSES:
Wm. W. Hill
L. D. Peck
INVENTOR:
Cassius Carroll Peck.

No. 759,306. PATENTED MAY 10, 1904.
C. C. PECK.
APPARATUS FOR MEASURING HEAT IN HOT WATER HEATING SYSTEMS.
APPLICATION FILED AUG. 20, 1902.
NO MODEL. 4 SHEETS—SHEET 3.
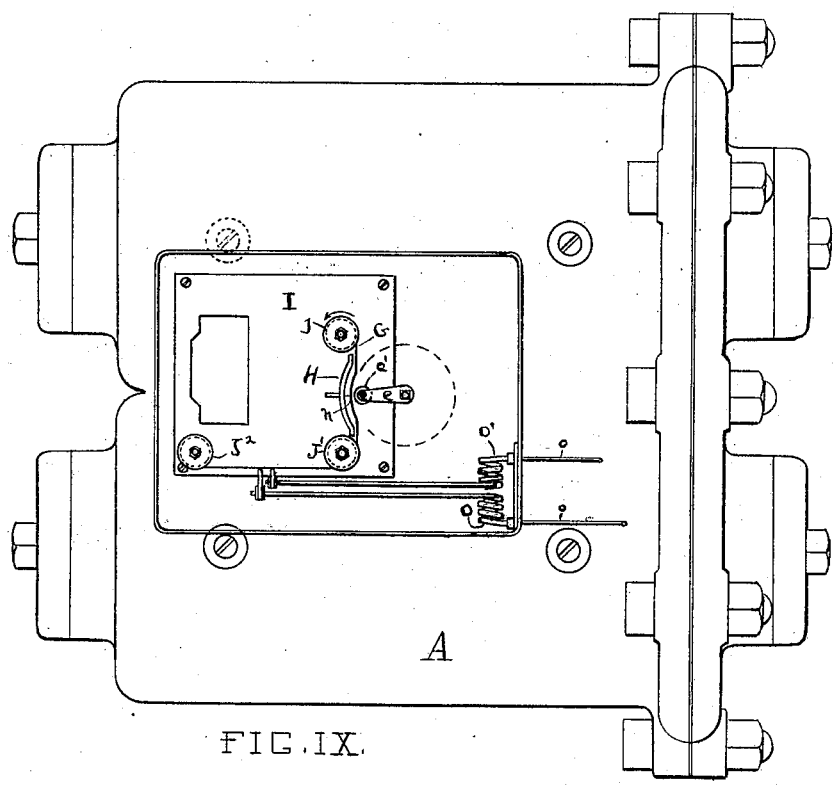
FIG. IX.
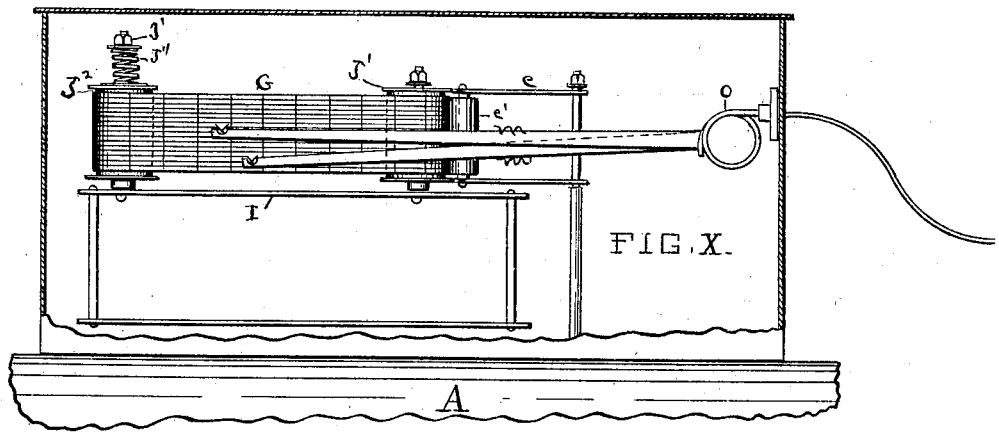
FIG. X.
WITNESSES:
S. D. Peck
Jno. H. McAnarney
INVENTOR:
Cassius Carroll Peck

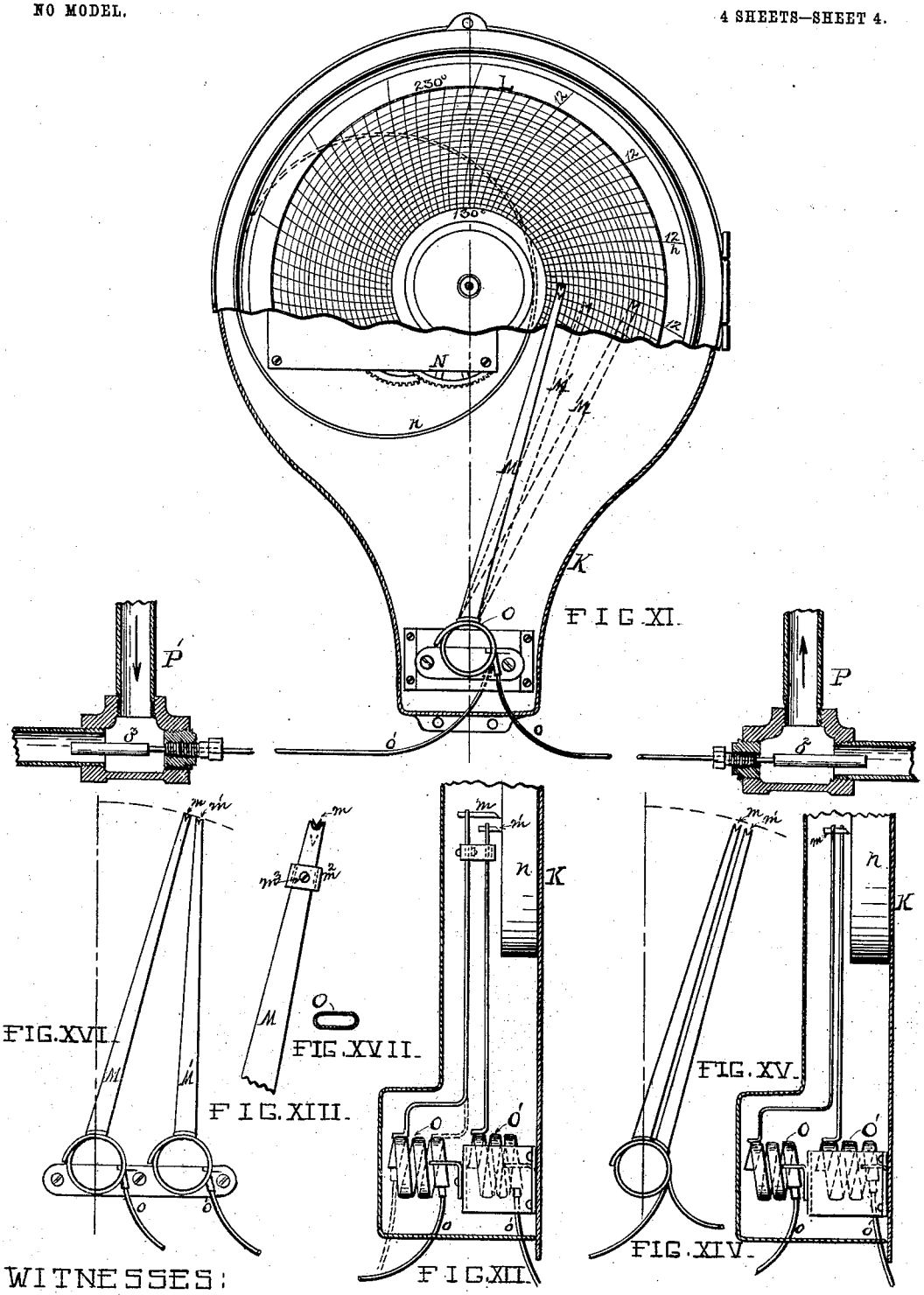

No. 759,306. Patented May 10, 1904.

UNITED STATES PATENT OFFICE.

CASSIUS CARROLL PECK, OF ROCHESTER, NEW YORK.

APPARATUS FOR MEASURING HEAT IN HOT-WATER HEATING SYSTEMS.

SPECIFICATION forming part of Letters Patent No. 759,306, dated May 10, 1904.

Application filed August 20, 1902. Serial No. 120,343. (No model.)

*To all whom it may concern:*

Be it known that I, CASSIUS CARROLL PECK, residing at Rochester, in the county of Monroe and State of New York, have invented certain new and useful Improvements in Apparatus for Measuring Heat in Hot-Water Heating Systems, of which the following is a specification sufficient to enable others skilled in the art to which it relates to make and use the same.

My invention relates to the measurement of heat supplied from a circulation of heated water in a hot-water heating system employed for heating either air or liquids, and more especially in case of such a system where the water employed for heating is mechanically forced through the pipes and radiators used for heating air or liquids. It is primarily intended for use in a central-station system of heating, in which it is important that the amount of heat delivered to each user should be determined in order that a correct charge may be made to correspond with such amount. One of the necessary steps to this end is to ascertain the weight of water which flows through the user's radiating-pipes and radiators each hour or during other period so short that this weight multiplied into the drop in temperature of the current in passing through said pipes and radiators will give with approximate exactness the number of heat units furnished to the user. Another necessary step is to take the temperature of the current of hot water flowing into the user's heating-pipes, together with the temperature of the outflowing current, in order that the difference between these two temperatures may be obtained for use as a multiplier, in connection with the weight of water circulated within the hourly period, used as a multiplicand, as above stated.

In a concurrent application for Letters Patent I describe and claim the complete process of determining the amount of heat supplied by a hot-water heating system.

The present application is confined to the mechanism required in the two steps referred to.

The first device required in my heat-measuring system is a meter for measuring the volume of flow in the heating system for each hour or other short time period, which may be determined by a reliable hot-water meter. My invention commences at the registering devices of the meters, and this part of my invention consists in adapting the registering mechanism for constantly recording on my time-chart the hourly volume of water circulation. It also includes said chart with clockwork or other means for moving it at uniform speed. The other device—namely, telethermometers for giving the temperature of the inflowing current of heated water in a hot-water heating system and also of the corresponding outflowing current, or else giving directly the difference in temperature between the two currents, all of which may be recorded on the chart—is of equal importance. In the drawings these two steps are shown both as divided into two instruments and as embodied in one instrument. The latter best meets most requirements; but in case of a very large volume of circulation, as in the main conduits or circulating-pipes proceeding from a central station, it is sometimes desirable to divide the apparatus into a time-recording meter and a double telethermometer.

To show fully the application to a water-meter of my invention, a well-known form of water-meter has been selected for illustration in the drawings; but my time-recording chart is equally applicable to other forms of meter, it being only necessary to properly arrange in relation to each other the primary registering-shaft of the meter and my mechanically-moved time-chart, so that the former shall impress upon the latter the volume-record. Also in the recording-thermometer, as shown separately from the meter, the drawings show a standard form of recording-thermometer arranged in the same case and operating in conjunction with the recording mechanism to record both the volume and the temperature of the water on one chart.

In the accompanying drawings like parts in all the figures are indicated by the same letters.

Figure 1 is an elevation of the top of the case of a water-meter, also showing inclosed in a supplemental case a top or plan view of the mechanism connected with my invention. Fig. 2 is a side elevation, on a larger scale, of the primary registering-shaft of the meter and of my recording devices. Fig. 3 is a plan or top view of a modification of my recording mechanism. Fig. 4 is an elevation of the impression-roller required for design shown in Fig. 3. Fig. 5 is a central cross-section of the meter-case and a sectional elevation of the recording mechanism. Fig. 6 is an elevation of a portion of the recording-ribbon used with the recording devices shown in Figs. 1, 2, 5, and 8. Fig. 7 is an elevation of a portion of the recording-ribbon used with the modification of recording mechanism shown in Figs. 3 and 4. Fig. 8 shows the lower half of the meter-case in side elevation, the upper half or portion above the horizontal center of the plungers being a central section of the case with one of the water-plungers and also the recording devices in elevation. Fig. 9 shows the same view of the meter-case as Fig. 1, the supplemental case being shown as containing a top view of my complete mechanism for registering the hourly flow of hot water and for recording on the same chart the temperature of both the outflowing current and of the inflowing current. Fig. 10 is a side elevation of my recording devices shown in Fig. 9, the case being broken away to expose same. Fig. 11 is an elevation of a convenient form of double-record thermometer for use independently of a meter, the lower portion of the case being broken away to show the internal mechanism. Fig. 12 is a sectional elevation of the instrument-case with the recording devices shown in Fig. 11, the view being at right angles to Fig. 11. Fig. 13 is an enlarged elevation of the arm which carries the marker or inking-point shown in Fig. 12. Fig. 14 is an elevation showing two marker-arms placed side by side instead of overlapping as in Figs. 11 and 12. Fig. 15 is a sectional elevation like Fig. 12 except that the marking-arms are shown as of equal length, as in Fig. 14, being a right-angle view of said arms. Fig. 16 is an elevation showing two helical coils with marker-arms attached arranged side by side. Fig. 17 is an enlarged cross-section of the flattened tube forming the coil which carries and actuates the marker-arm.

In the several figures, A is the case of a Worthington water-meter.

B B, Figs. 5 and 8, are the plungers, which are fitted in parallel rings $b$ $b$, Fig. 8. Water under pressure is admitted through the proper inlet-ports into chamber C at one end of each plunger alternately, while the connection is made between the chamber at the other end of the outlet. Thus the plunger in moving displaces its volume, discharging it through its outlet. The stroke of the two plungers alternates, the valve actuated by one admitting pressure to the other. The plungers are brought to rest at the end of the stroke by buffers $c$ $c$. One plunger imparts a reciprocating motion to the lever D, which actuates the recording mechanism through shaft D' and ratchet-wheel E on shaft E'. The reciprocating movement of plunger B moves lever D first one way and then the other way, each movement being equal to the stroke of the plunger, and the lever being attached to shaft D' turns the shaft a certain amount for each stroke of the plunger. The upper end of shaft D' carries an arm $d$, Fig. 8, having at its outlet end a pawl $d'$, which engages with ratchet-wheel E, affixed to shaft E'. At the upper end of the latter are two arms $e$ $e$, secured to the shaft and carrying at their outer ends a vertically-set roller $e'$. The office of this roller is to press the paper ribbon G into contact with the metallic point $h$, fixed in the plate H, Fig. 1, the groove in roller $e'$ corresponding with said point, so that the ribbon shall be punctured by the point as the roller passes it without bringing the point in contact with the roller. Clockwork $i$, contained in frame I, drives roller J, to which ribbon G is attached, and gradually unrolls it from roller J'. The ribbon is kept sufficiently taut by screwing down more or less the nut $j$ upon spring $j'$, Fig. 2. The clockwork is usually made for running eight days without rewinding. On the face of ribbon G is printed a chart, as $g$ $g'$, Figs. 6 and 7, for indicating hours or other short and uniform periods of time, the vertical lines in said figures representing the equal periods. Perforations $g$, made by point $h$, show the number of revolution of shaft E' within each of the time periods of the chart and within any number of such periods, as each revolution of said shaft causes point $h$ to puncture ribbon G through being pressed against the point by roller $e'$, said point entering the groove in said roller.

In Fig. 3, H' is a modification of plate H (shown in Fig. 1) in that it has four faces each with a metallic point $h$, these points being set one above the other, as indicated by the position of holes $g$ made in ribbon G by the four points, as shown in Fig. 7. The object is to provide more room between hour-marks on the ribbon for perforations. Plate H' is rotated by pinion $e^3$ on shaft E', the pinion engaging with roller gear-wheel $e^4$ and this in turn with spur-wheel $e^5$ on shaft $h'$, to which is attached plate H, the gear being so proportioned that one revolution of shaft E' will give shaft $h'$ a quarter-turn. Instead of plate H' a plate with more or less faces can be employed, the driving-gear being proportioned so as to bring each face in line with shaft E' at the moment roller $e'$ passes the point $h$.

In a central-station system in which heat is supplied by a mechanically-forced circulation of hot water to various buildings and to numerous users the quantity of heat required by different users is likely to vary greatly and the measuring and recording capacity of the time-recording meters need to differ correspondingly. In the time-quantity devices this variation can be conveniently provided for in two ways—namely, first, by proportioning the length of lever D and the diameter of ratchet-wheel E so that shaft E' shall make one revolution for the desired number of strokes of plunger B, and, second, by either moving the ribbon G at a greater or less speed by proper provision in clockwork $i$ and diameter of roller J, so that the distance between vertical lines of the chart-ribbon G shall be greater or less, or else making the number of points $h$ and plates H such as to give requisite space on the ribbon for puncturing a sufficient number of holes to give the record of the maximum amount of circulation without having one hole run into, and thus be confused with another. A third way is to use but one point-plate and point, as H $h$, and attach this by an arm to shaft $h'$, driven by similar gearing to $e^3$ $e^4$ $e^5$ to the end that shaft $h'$ shall be revolved as often as required for registering on ribbon G. This latter arrangement is suitable where the hourly circulation is small in amount. Where there is a somewhat larger circulation, the single fixed plate H, with point $h$, is suitable, and for larger quantities the arrangement shown in Fig. 3 is a good one. Where only one fixed point-plate, as H, is used and the amount of circulation is large, so as to require long spaces for time periods on ribbon G and correspondingly rapid movement of said ribbon, it becomes necessary to increase the diameter of the roller J in proportion to speed in order to avoid a sufficient increase of speed of the ribbon toward the end of the time for which the clockwork is made to run to involve error in the time-record, this increase of speed being due to enlargement of diameter of the winding-roller by continuous winding of the ribbon upon it, or else the time-spaces on the ribbon must be increased in length as the end is approached, so as to exactly compensate for increased speed of the ribbon. As thickness of the ribbon will determine the amount of increase in speed, it is desirable that the ribbon shall be as thin as is consistent with requisite strength and with retaining the record made by perforating or marking the surface. Ribbon G can be made of strong smooth paper or of calendered, sized, and otherwise properly-prepared cloth or of a combination of cloth and paper or even of very thin metal.

At the time of winding the clock a fresh ribbon can be conveniently substituted for the one which has been used. Ribbon G can, however, be made of sufficient length to last during two or three winding periods. From the used ribbon a book-record of hourly (or other short time) circulation is taken, and the ribbon can then be filed as a permanent record, each ribbon being preferably dated both when placed in the meter and when taken out.

I do not confine myself to the exact recording mechanism shown and described, as various equivalents may be used for the several parts without departing from the essential feature of this part of my invention. Thus a rotating circular disk, similar to one shown in Fig. 2 of the drawings, may be substituted for ribbon G and rollers J J', and this disk may be set either vertically or horizontally. In this case a crayon-point held by a spring in proper position for constantly recording is the most convenient means of registering the meter measurements on the chart. Even with the ribbon and rollers a spring-impelled crayon-point may be substituted for roller $e'$ and metallic point $h$. For convenience said point is shown as making a round perforation in the ribbon; but instead of a round point like a needle it may have a cutting edge like the point of a knife, so as to cut a slit in ribbon G. The metallic point is preferred to a crayon, because it requires less attention and gives a record which cannot be easily effaced. A fixed bearing-surface provided with a groove will answer in place of roller $e'$; but the roller is preferable, as offering less frictional resistance.

Referring to the second step required in securing data for calculating the amount of heat delivered from water circulation in a hot-water heating system, Figs. 11 to 17, both inclusive, show devices for taking and recording the temperature of the inflowing current supplying the heating system with hot water and for taking and recording the temperature of the same water after having passed through the system of pipes and radiators connected with the heating system. In Fig. 11 K is the case of the recording instrument and L the chart on which marking-arms M M' draw the record-lines, said lines being made either with crayon-points or with inking-points $m$ $m'$, one arm being extended beyond the other to prevent interference of the two inking-points. Chart L is revolved at uniform speed by clockwork N in case $k$. For a hot-water heating system the chart is divided into radial markings, representing hours, and into circular markings, representing temperatures. The subdivisions on the chart are usually for one hundred and ninety-two hours, and the temperature ranges from 50° to 100° Fahrenheit—say from 130° to 230°—the clockwork being made to run eight days without rewinding. With these conditions it will be necessary to supply a new chart and wind the clock once a week. Marker-arms M M' are attached to the free end of helically-formed flattened metallic tubes O O', the opposite end of each tube being anchored to the case K and attached to the small tubes $o$ $o'$, which at the other end are attached to the thermometer-bulbs $o^2$ $o^3$, respectively, inserted in pipes P P'. The connecting-pipes $o$ $o'$ are preferably made of copper or brass. The distance between pipes P P' to coils O O' is optional and may be as much as twenty to twenty-five feet. Coils O O', pipes $o$ $o'$, and thermometer-bulbs $o^2$ $o^3$ are all filled preferably with alcohol, the expansion of which by heat applied to said thermometer-bulbs creates pressure which tends to straighten out the coils, and thus move the marker-arms M M' laterally across the face of chart L in proportion to the degree of pressure. Thus in Fig. 11 marker M, which indicates the higher of the two temperatures, is shown in solid lines at about the starting-point—say 130° to 140°—and in broken lines at a point which may indicate 200°, which latter might be the temperature of water entering the building being heated. The shorter marker-arm M', as shown in broken lines, may represent the temperature of water on leaving the building after circulating through radiators and pipes—say 40° below the initial temperature—although this would represent greater than average difference in a good heating system. On a good-sized chart the difference, whatever it was, would be seen by a glance at the lines made by the two markers, and the record of difference in temperature would be conveniently taken down on a blank, usually made for hourly record.

Whether coils O O' are placed one in front of the other, as in Figs. 11, 12, and 15, or side by side, as in Fig. 16, is not important. In the former instance the inclosing case K needs to be deeper than in the latter, while in the side-by-side arrangement it requires to be broader than in the former. Also one coil can be set below the other, which would require increase in length rather than in the width of the case. The fact that the marker-arm M of the intake-pipe will never be required to record less temperature than arm M' for the outflow-pipe and when the heating system is in operation will show higher temperature permits the said recording-arms to be made of the same length and set side by side, as in Figs. 14 and 16. Said arms may be set in the same vertical plane or one arm located in front of the other, as shown in Fig. 15.

In Figs. 12 and 13 marker-arms M M' are shown as bound together at the pointer ends by a sleeve $m^2$, held in position by a bolt $m^3$. This arrangement requires a differently-lined chart and is for the purpose of reading the difference between two temperatures by a single line drawn by point $m$ on the chart. The radial or time lines on the chart would remain as heretofore described; but the circular lines would be made to indicate difference in temperatures and not the temperatures themselves. If the range of temperature to be measured be 100° and there are twenty circular lines on the chart, then the space between each two circular lines will represent 5°, or if there be fifty circular lines then the space between two lines will represent 2°. Coils O O' are set in such relation to each other that marker-arms M M' shall be actuated in opposite directions by expansion of the coils, and thus oppose each other, under which condition only the excess of pressure on one arm as compared with the other arm will cause a lateral movement of pointer $m$, and the extent of this lateral movement will be the measure of difference of temperature at the two points where the two thermometer-bulbs $o^2$ $o^3$ are located. The reverse position of one of the two coils O O' and of marker-arm M is indicated by broken lines in Fig. 12.

I do not confine myself to the form of coils O O' or the exact form of other parts shown, as these may be variously modified to suit conditions and without departing from the spirit of my invention, which includes bringing together two suitable temperature-indicating mechanisms in one case and so arranging the parts that each recorder shall separately mark on one and the same chart the temperature to which its thermometer-bulb is subjected or so that the difference between the two temperatures to which the bulbs of the thermometers are exposed shall be recorded by a single line on a chart.

Figs. 9 and 10 show the mechanism of the two steps which have heretofore been described in detail as embodied in one apparatus. This simply requires, in addition to the mechanism before described, an additional roller $J^2$, on which spring $j''$ rather than on roller J'. Coils O O' are properly placed for actuating marker-arms M M', so that they will record on ribbon G. The horizontal lines on said ribbon are made to represent temperatures if marker-arms M M' are used independently, as shown in Fig. 10, or if the two arms are united then the horizontal lines would be made for representing difference in temperature between the inflowing current of the heating system and the outflowing current. The vertical lines on the ribbon would represent hours or other short-time periods and would be the same as if the ribbon were to be used for recording meter measurements only. The advantage of assembling all the devices required for obtaining data for calculating the amount of heat being delivered from a hot-water heating system in one compound instrument, so that the apparatus may be easily installed at low cost, in minimum space, and with greatest convenience in taking off the record of temperatures and quantity of circulation, is secured by having all records made on one chart.

Having described my invention, what I claim, and desire to secure by Letters Patent, is—

1. In a recording device for heating systems embodying a circulating-pipe, the combination with a movable record-sheet of a plurality of telethermometers for recording the temperatures of a fluid at different points in the circulating-pipe, having separate recording-arms and a connection between said arms whereby a single record as a resultant between said telethermometers will be produced upon the record-sheet.

2. The combination with a heating system embodying a circulating-pipe of a movable record-sheet, a meter operated by the fluid in the pipe, and a registering device coöperating with the record-sheet and operated by the meter, a telethermometer operated by the fluid in the pipe, and embodying an arm coöperating with the record-sheet.

3. The combination with a heating system embodying a circulating-pipe of a record-sheet and means of moving it at a uniform rate of speed, a meter operated by the fluid in the pipe, and a device operated by the meter for registering on the record-sheet the quantity of a fluid flowing through the meter in a given time, a plurality of telethermometers coöperating with the record-sheet to register thereon the temperatures of the fluid at different points in the circulating-pipe.

4. In a fluid-measuring device the combination with a circulating-pipe, and a fluid-meter arranged therein, of a record-sheet, means of moving it, a projection and means operated by the meter for moving the projection and record-sheet relatively to perforate the latter.

5. In a fluid-measuring device, the combination with a circulating-pipe, and a fluid-meter arranged therein, of a record-sheet, means of moving it, and a projection arranged at one side of the sheet, and an arm operated by the meter to force the sheet into engagement with the projection.

6. In a hot-water heating system the combination of pipes, through which all the water passes, a water-meter connected to said circuit, a registering-shaft which always turns in the same direction, a time-shaft driven by clockwork, and adapted for receiving a record of the number of revolutions of said shaft, a marking-point system with arms attached to the meter-shaft, substantially as described.

7. In a hot-water heating system having a hot-water meter fitted with a time-chart moved by clockwork and designed for recording the flow of liquid through the meter for uniform periods of time, the combination with said chart and driving mechanism of pinion $e^3$, gear-wheels $e^4$, $e^5$, for revolving a point-carrier H, or H', said gearing being driven by shaft, or spindle, E', operated by the measuring parts of the meter, and the points $h$ arranged for recording the revolutions of said spindle, substantially as described.

8. In a hot-water heating system having a recording-thermometer for recording the difference in two temperatures, consisting of two recording mechanisms inclosed in one case, each mechanism being composed of an expansible coil, attached to a marker-arm having a marking-point, and connected by a small pipe to a thermometer-bulb outside the case, the bulb being located at the point where the temperature is to be taken, and the coil, tube and thermometer containing a liquid causing extension of the coil by expansion of the liquid through heat applied to the thermometer-bulb, the placing and connecting of the two expansion-coils and the two marker-arms so bound together that the extension of one coil by pressure shall act in opposition to the expansion of the other coil, to the end that the two marker-arms, bound together and acting as one, shall not be moved laterally except through excess of pressure in one coil as compared with the other coil, and only to the extent corresponding with this excess of pressure, the double arm recording this excess of pressure on a movable chart, substantially as described.

CASSIUS CARROLL PECK.

Witnesses:
JNO. H. MCANARNEY,
L. D. PECK.